United States Patent
Yuyama et al.

(10) Patent No.: US 8,788,165 B2
(45) Date of Patent: Jul. 22, 2014

(54) ABNORMAL STATE DIAGNOSIS METHOD FOR OIL TEMPERATURE SENSOR OF AUTOMATIC TRANSMISSION

(71) Applicant: JATCO Ltd, Fuji (JP)

(72) Inventors: Yasuhiko Yuyama, Fuji (JP); Hajime Tasaka, Fuji (JP); Masahiro Hamano, Himeji (JP)

(73) Assignee: JATCO Ltd, Fuji-shi (JP)

( * ) Notice: Subject to any disclaimer, the term of this patent is extended or adjusted under 35 U.S.C. 154(b) by 0 days.

(21) Appl. No.: 13/669,677

(22) Filed: Nov. 6, 2012

(65) Prior Publication Data

US 2013/0116900 A1    May 9, 2013

(30) Foreign Application Priority Data

Nov. 7, 2011    (JP) .................................. 2011-243015

(51) Int. Cl.
*G01K 13/02*    (2006.01)
(52) U.S. Cl.
USPC ............................................. 701/58; 374/144
(58) Field of Classification Search
USPC ........................................... 701/58; 374/144
See application file for complete search history.

(56) References Cited

U.S. PATENT DOCUMENTS 5,995,887 A * 11/1999 Hathaway et al. ........... 701/30.1
2006/0056481 A1 * 3/2006 Melby et al. ..................... 374/1

FOREIGN PATENT DOCUMENTS

| DE | 198 55 971 A1 | 6/2000 |
| JP | 07-301315 A | 11/1995 |
| JP | 2004-011869 A | 1/2004 |

* cited by examiner

*Primary Examiner* — Mary Cheung
*Assistant Examiner* — Yuen Wong
(74) *Attorney, Agent, or Firm* — Foley & Lardner LLP

(57) ABSTRACT

An abnormal state diagnosis method for an automatic transmission oil temperature sensor includes: a warm-up judging step of judging whether a sensor value from an engine side temperature sensor in an engine warm-up state indicates the engine warm-up state; a sensor normal operation judgment step of starting to judge whether the engine side temperature sensor including the warm-up judgment result normally performs a temperature detection operation; a provisional judgment step of judging whether an upper or lower deviation width between the sensor value of the engine side temperature sensor and an oil temperature sensor value from an automatic transmission oil temperature sensor is equal to or smaller than a predetermined threshold value; and a final judgment step of determining the judgment result by the provisional judgment step when the automatic transmission control unit receives a permission signal from the engine control module.

4 Claims, 7 Drawing Sheets

ABNORMAL STATE DIAGNOSIS METHOD FOR OIL TEMPERATURE SENSOR OF AUTOMATIC TRANSMISSION

BACKGROUND OF THE INVENTION

This invention relates to an abnormal state diagnosis method for an oil temperature sensor of an automatic transmission which is configured to diagnose an abnormal state of an oil temperature sensor value by a mutual diagnosis between an engine control module and an automatic transmission control unit.

A patent document 1 (Japanese Patent Application Publication No. 7-301315) discloses an abnormal state diagnosis method for an oil temperature sensor of an automatic transmission which is configured to determine an abnormal state judgment of the oil temperature sensor based on a judgment that an abnormal value continues during a predetermined time period or more when an oil temperature sensor value indicates the abnormal value.

Moreover, a patent document 2 (Japanese Patent Application Publication No. 2004-11869) discloses an abnormal state diagnosis method for an oil temperature sensor of an automatic transmission in which an AT control unit receives signals from an engine intake air temperature sensor and an outside air temperature sensor, and which is configured to compare the outside air temperature and the oil temperature, and to judge that the oil temperature sensor is in the abnormal state when the oil temperature is lower than the outside air temperature.

SUMMARY OF THE INVENTION

However, in the abnormal state diagnosis method for the oil temperature sensor of the automatic transmission of the patent document 1, the abnormal state is judged only by using the oil temperature sensor value. Accordingly, it is not possible to judge an offset abnormal state in which the oil temperature sensor value is deviated from a normal value. In addition, even when the oil temperature sensor value is the abnormal value, the judgment result cannot be obtained before a predetermined time period elapsed from showing the abnormal value.

Moreover, in the abnormal state diagnosis method for the oil temperature sensor of the automatic transmission of the patent document 2, the abnormal state of the oil temperature sensor is judged only by using the AT control unit after a vehicle running state is continued during a predetermined time period or more after the start of the engine. Accordingly, it is not possible to judge the offset abnormal state in which the oil temperature sensor value is deviated on a higher side of the normal value. In addition, there is a problem that the judgment result cannot be obtained before a sufficient time period of the vehicle running elapses after the engine start.

It is, therefore, an object of the present invention to provide an abnormal state diagnosis method for an oil temperature sensor of an automatic transmission, which is devised to solve the above-mentioned problems, and which is configured to obtain a judgment result of an offset abnormal mode in which an oil temperature sensor value is deviated from a normal value, immediately after the restart of the engine, without conditioning on the vehicle running.

According to one aspect of the present invention, an abnormal state diagnosis method for an oil temperature sensor of an automatic transmission, the abnormal state diagnosis method comprises: a warm-up judging step of judging whether or not a sensor value from an engine side temperature sensor in an engine warm-up state indicates the engine warm-up state, in an engine control module configured to control an engine; a sensor normal operation judgment step of reading the warm-up judgment result by the warm-up judgment step in the engine control module when the engine is restarted after waiting for an engine cold state by an engine stop after the engine warm-up state, and of starting to judge whether or not the engine side temperature sensor including the warm-up judgment result normally performs a temperature detection operation, in the engine control module; a provisional judgment step of receiving the sensor value from the engine side temperature sensor in an automatic transmission control unit arranged to control an automatic transmission connected with the engine when the engine is restarted after waiting for the engine cold state by the engine stop after the engine warm-up state, and of judging whether or not an upper or lower deviation width between the sensor value of the engine side temperature sensor and an oil temperature sensor value from an automatic transmission oil temperature sensor is equal to or smaller than a predetermined threshold value, in the automatic transmission control unit; and a final judgment step of determining the judgment result by the provisional judgment step in the automatic transmission control unit when the automatic transmission control unit receives a permission signal outputted from the engine control module based on a judgment that the engine side temperature sensor is normally operated.

DETAILED DESCRIPTION OF THE INVENTION

Hereinafter, an embodiment to attain an abnormal state diagnosis method for an oil temperature sensor of an automatic transmission according to the present invention is illustrated in detail with reference to the drawings.

The abnormal state diagnosis method for the oil temperature sensor of the automatic transmission is explained hereinafter with respect to "system configuration to which the abnormal state diagnosis method is applied", "control block configuration of the abnormal state diagnosis method", "warm-up judgment step", "sensor normal operation judgment step", "provisional judgment step and final judgment step", "problems of abnormal state detection of AT oil temperature sensor", and "function of offset abnormal mode detection by mutual diagnosis".

[System Configuration to which Abnormal State Diagnosis Method is Applied]

Figure 1:
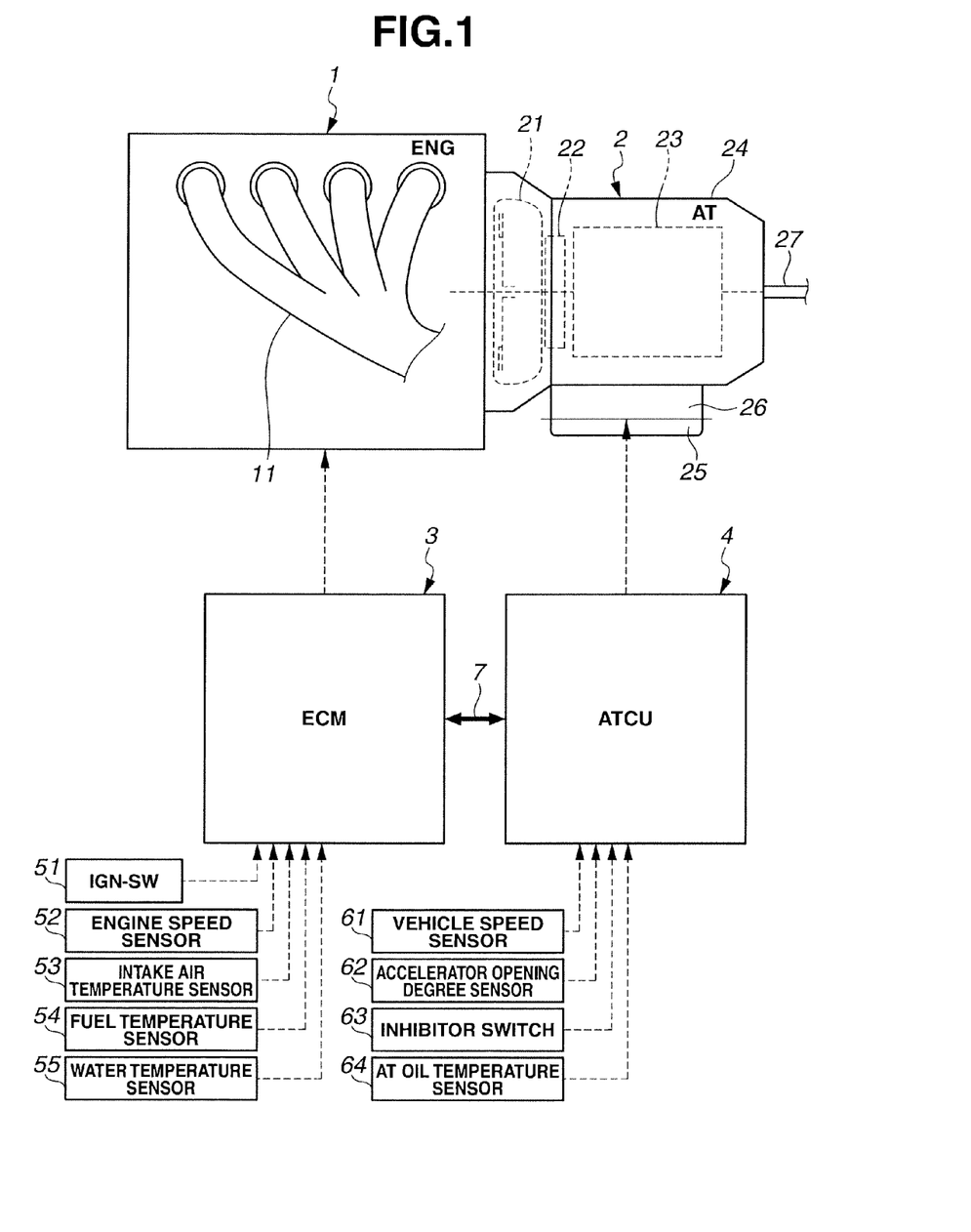
FIG. 1 is a system configuration view showing a system to which an abnormal state diagnosis method for an oil temperature sensor of an automatic transmission according to a first embodiment of the present invention is applicable.

FIG. 1 is a view showing a system to which the abnormal state diagnosis method for the oil temperature sensor of the automatic transmission according to a first embodiment of the present invention is applied. Hereinafter, the system configuration to which the abnormal state diagnosis method is applied is illustrated.

As shown in FIG. 1, the system to which the abnormal state diagnosis method for the oil temperature sensor of the automatic transmission according to the first embodiment is applied includes an engine 1, an automatic transmission 2, an engine control module 3, and an AT control unit 4 (automatic transmission control unit).

Engine 1 is an internal combustion engine arranged to operate by air-fuel mixture of a gasoline, a light oil (gas oil), and so on serving as fuel. Engine 1 includes exhaust pipes 11 arranged to exhaust (discharge) an exhaust gas after the combustion, to the outside.

Automatic transmission 2 includes a torque converter 21 which has a lockup clutch, and which is connected to a crank shaft of engine 1; an oil pump 22; a gear train 23, and so on. An oil pan 25 and a control valve unit 26 are provided to a transmission case 24 of this automatic transmission 2. Oil pan 25 stores a hydraulic fluid of the transmission. Control valve unit 26 is arranged to receive a discharge pressure of oil pump 22 as a source pressure, and to produce a lock-up pressure, a line pressure, a shift pressure and so on. Moreover, a transmission output shaft 27 of automatic transmission 2 is connected to wheels (not shown).

The above-described engine control module 3 (ECM) is an electronic control module which performs various control operations relating to the engine, such as a start control, and a fuel injection control of engine 1. This engine control module 3 receives switch signals and sensor signals from an ignition switch 51, an engine speed sensor 52, an intake air temperature sensor 53, a fuel temperature sensor 54 (engine side temperature sensor), a water temperature sensor 55 (engine side temperature sensor), and so on. Intake air temperature sensor 53 is provided to an intake air pipe system of engine 1. Intake air temperature sensor 53 is arranged to sense a temperature of the intake air to engine 1. Fuel temperature sensor 54 is provided to a fuel tank (not shown). Fuel temperature sensor 54 is arranged to sense a temperature of the fuel to engine 1. Water temperature sensor 55 is provided to a coolant water circulating system of engine 1. Water temperature sensor 55 is arranged to sense a temperature of the engine coolant water.

The above-described AT control unit 4 (ATCU) is an electronic control unit arranged to perform control operations relating to the automatic transmission, such as a lock-up control, a line pressure control, a shift control of automatic transmission 2. This AT control unit 4 receives switch signals and sensor signals from a vehicle speed sensor 61, an accelerator opening degree sensor 62, an inhibitor switch 63, an AT oil temperature sensor 64 (automatic transmission oil temperature sensor), and so on. AT oil temperature sensor 64 is provided to a hydraulic fluid circulating system of the transmission. AT oil temperature sensor 64 is arranged to sense a temperature of the hydraulic fluid of the transmission. This AT oil temperature sensor 64 is a component relating to the exhaust gas. An oil temperature sensor value of this AT oil temperature sensor 64 is used as an oil temperature information for the lock-up control, the line pressure control, the shift control, and so on when AT control unit 4 controls automatic transmission 2. Engine control module 3 and AT control unit 4 are connected to each other by bidirectional communication lines 7 (for example, CAN communication line) which are capable of exchanging the information.

Figure 2:
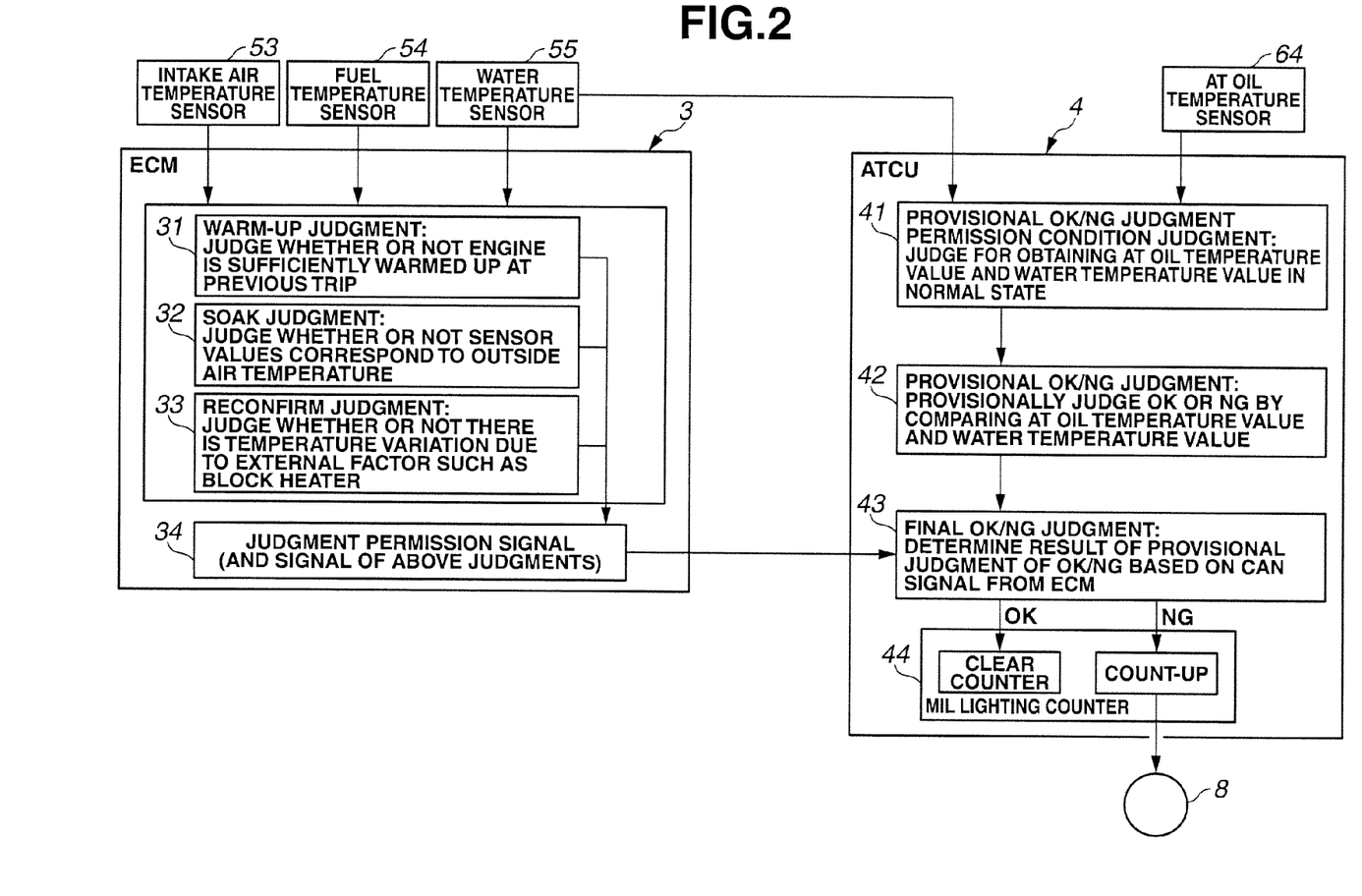
FIG. 2 is a block diagram showing control blocks for the abnormal state diagnosis method of the automatic is transmission oil temperature sensor according to the first embodiment of the present invention.

[Control Block Configuration of Abnormal State Diagnosis Method]FIG. 2 shows control blocks for the abnormal state diagnosis method for the oil temperature sensor of the automatic transmission according to the first embodiment of the present invention. Hereinafter, the control block configuration of the abnormal state diagnosis method is illustrated with reference to FIG. 2.

As shown in FIG. 2, engine control module 3 (ECM) includes a warm-up judgment section 31, a soak judgment section 32, a reconfirm judgment section 33, and a judgment permission signal output section 34.

Warm-up judgment section 31 receives sensor signals from fuel temperature sensor 54 and water temperature sensor 55. Warm-up judgment section 31 is configured to judge whether or not the sensor values from fuel temperature sensor 54 and water temperature sensor 55 at the previous trip (at the previous time) which is in the engine warm-up state are values indicative of the engine warm-up state.

Soak judgment section 32 receives sensor signals from fuel temperature sensor 54 and water temperature sensor 55. Soak judgment section 32 is configured to judge whether or not the sensor values from fuel temperature sensor 54 and water temperature sensor 55 at this trip (at this time) which is in the engine cold state are values corresponding to the outside temperature.

Reconfirm judgment section 33 receives the sensor signals from fuel temperature sensor 54 and water temperature sensor 55. Reconfirm judgment section 33 is configured to judge whether or not these values are the variations indicative that there is temperature variation according to the external factor, due to the external factor such as a block heater.

When all of the judgment results from warm-up judgment section 31, soak judgment section 32, and reconfirm judgment section 33 are YES judgment, judgment permission signal output section 34 outputs a judgment permission signal to a final OK/NG judgment section 43 of AT control unit 4.

As shown in FIG. 2, AT control unit 4 (ATCU) includes a provisional OK/NG judgment permission condition judgment section 41, a provisional OK/NG judgment section 42, final (definitive) OK/NG judgment section 43, and an MIL lighting counter section 44.

Provisional OK/NG judgment permission condition judgment section 41 receives the water temperature sensor value from water temperature sensor 55, and the oil temperature sensor value from AT oil temperature sensor 64. Provisional OK/NG judgment permission condition judgment section 41 judges a provisional OK/NG judgment permission condition for obtaining the water sensor value and the oil temperature value in a normal (appropriate) state. In this case, the provisional OK/NG judgment permission condition is a timer (elapsed time period) from the switching of ignition switch 51 to the ON state, a condition that the voltage is equal to or greater than a prescribed voltage (specified voltage), and so on. The provisional OK/NG judgment permission is performed when the sufficient time period has elapsed from the engine warm-up state by the previous trip to the engine cold state by the engine stop.

When the provisional OK/NG judgment permission condition is satisfied, provisional OK/NG judgment section 42 is configured to compare the water temperature sensor value and the oil temperature sensor value, and to output the OK judgment or the NG judgment as the provisional judgment. In this case, when an upper deviation width or a lower deviation width (an upper or lower deviation width) between the water temperature sensor value and the oil temperature sensor value is equal to or smaller than a predetermined threshold value, provisional OK/NG judgment section 42 outputs the OK judgment. When the upper deviation width or the lower deviation width (the upper or lower deviation width) between the water temperature sensor value and the oil temperature sensor value is greater than the predetermined threshold value, provisional OK/NG judgment section 42 outputs the NG judgment. Besides, as to the threshold value of the deviation width, an upper deviation threshold value and a lower deviation threshold value may be identical value, and the upper deviation threshold value and the lower deviation threshold value may be different values.

When final OK/NG judgment section 43 receives the judgment permission signal from judgment permission signal output section 34 of engine control module 3, final OK/NG judgment section 43 (finally, definitively) determines the judgment result (the OK judgment or the NG judgment) from provisional OK/NG judgment section 42.

When MIL lightning counter section 44 receives the OK judgment from final OK/NG judgment section 43, MIL lightning counter section 44 clear a counter. When Mil lightning counter section 44 receives the NG judgment, MIL lightning counter section 44 counts up the counter. Consequently, when the counter is counted up based on the NG judgment, MIL lightning counter section 44 lights an exhaust air warning light 8 which is disposed at a position which the driver inside the vehicle can see.

[Warm-Up Judgment Step]

Figure 3:
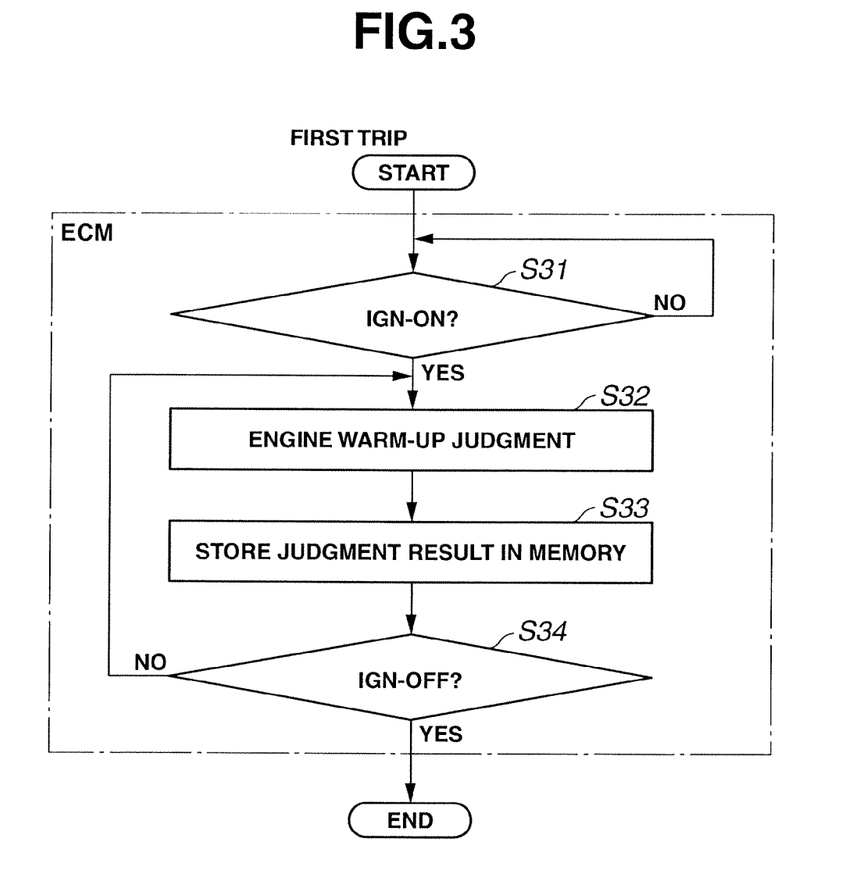
FIG. 3 is a flowchart showing a flow of a warm-up judgment step performed at a first trip in an engine control module according to the first embodiment of the present invention.

FIG. 3 shows a flow of a warm-up judgment step performed at a first trip by engine control module 3 (ECM) in the first embodiment of the present invention.

Hereinafter, the warm-up judgment step is illustrated with reference to the flowchart of FIG. 3.

At step S31, engine control module 3 judges whether or not the switch signal from ignition switch 51 is the ON state. When the answer of step S31 is affirmative (YES; IGN-ON), the process proceeds to step S32. When the answer of step S31 is negative (NO; IGN-OFF), the process repeats the judgment of step S31.

Subsequently to the judgment of the IGN-ON at step S31 or the judgment of the IGN-ON at step S34, at step S32, engine control module 3 performs the engine warm-up judgment to judge whether or not the sensor values from fuel temperature sensor 54 and water temperature sensor 55 are the values indicative of the engine warm-up state. Subsequently to step S32, the process proceeds to step S33.

Subsequently to the engine warm-up judgment at step S32, at step S33, engine control module 3 stores the judgment result by the engine warm-up judgment in the memory. Subsequently to step S33, the process proceeds to step S34.

In this case, as to the judgment result by the engine warm-up judgment, when all of the sensor values from temperature sensors 54 and 55 are the values indicative of the engine warm-up state, "the judgment result: YES" is stored in the memory. When at least one of the sensor values of temperature sensors 54 and 55 is the value which is not indicative of the engine warm-up state, "judgment result: NO" is stored in the memory. This memory storage is renewed at each engine warm-up judgment from the IGN-ON to the IGN-OFF. The judgment result renewed at the last time is left in the memory storage.

Subsequently to the memory storage of the judgment result at step S33, at step S34, engine control module 3 judges whether or not the switch signal from ignition switch 51 is the OFF state. When the answer of step S34 is affirmative (YES; IGN-OFF), the process is finished. When the answer of step S34 is negative (NO; IGN-ON), the process returns to step S32.

Accordingly, when ignition switch 51 is brought from the OFF state to the ON state, the process proceeds as step S31->step S32->step S33->step S34 in the flowchart of FIG. 3. While ignition switch 51 is held to the ON state, in the flowchart of FIG. 3, the process of step S32->step S33->step S34 is repeated.

Accordingly, while engine 1 is not brought to the warm-up state at a timing immediately after the ignition switch 51 is switched from the OFF state to the ON state, the sensor values of temperature sensors 54 and 55 are the values which do not indicate the engine warm-up state. Accordingly, at step S33, "the judgment result; NO" is stored in the memory.

On the other hand, when engine 1 is brought to the warm-up state after the predetermined time period elapsed from the timing at which ignition switch 51 is switched from the OFF state to the ON state, the sensor values of temperature sensors 54 and 55 are the values indicative of the engine warm-up state as long as there is no abnormal state of the sensor. Accordingly, at step S33, "the judgment result: YES" is stored in the memory.

Then, at a timing immediately before ignition switch 51 is switched from the ON state to the OFF state, the judgment result renewed at the last time is left in the memory storage.

That is, the flowchart shown in FIG. 3 corresponds to the warm-up judgment step that engine control module 3 configured to control engine 1 judges whether or not the sensor values from the engine side temperature sensors (fuel temperature sensor 54 and water temperature sensor 55) in the engine warm-up state represent the engine warm-up state.

[Sensor Normal Operation Judgment Step]

Figure 4:
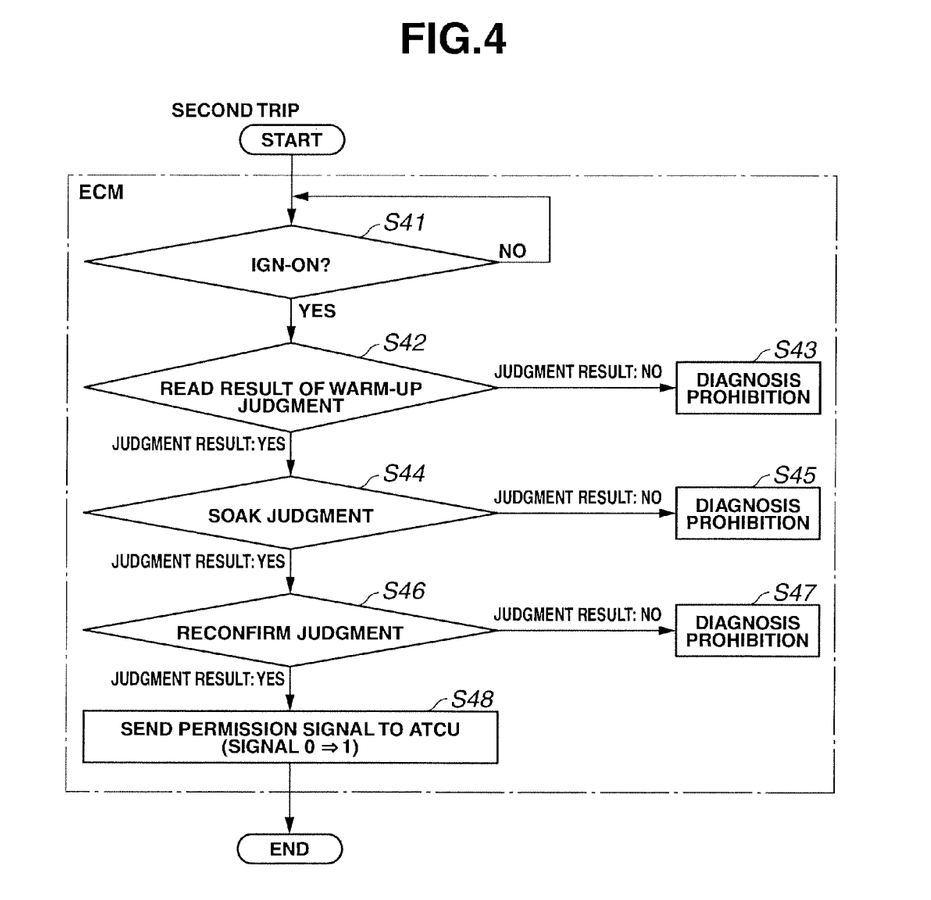
FIG. 4 is a flowchart showing a flow of a sensor normal operation judgment step performed at a second step in the engine control module according to the first embodiment of the present invention.

FIG. 4 shows a flow of a sensor normal operation judgment step performed at the second trip by engine control module 3 (ECM) according to the first embodiment. Hereinafter, the sensor normal operation judgment step is illustrated with reference to the flowchart of FIG. 4.

At step S41, engine control module 3 judges whether or not the switch signal from ignition switch 51 is the ON state. When the answer of step S41 is affirmative (YES; IGN-ON), the process proceeds to step S42. When the answer of step S41 is negative (NO; IGN-OFF), the process repeats the judgment at step S41.

Subsequently to the judgment of the IGN-ON at step S41, at step S42, engine control module 3 reads the judgment result by the warm-up judgment performed by the warm-up judgment step (FIG. 3) at the previous trip (=the first trip). Engine control module 3 judges whether or not it is "the judgment result: YES". In case of "the judgment result: YES" at step S42, the process proceeds to step S44. In case of "the judgment result: NO" at step S42, the process proceeds to step S43.

Subsequently to the judgment of "the judgment result: NO" at step S42, at step S43, engine control module 3 prohibits the abnormal state diagnosis of AT oil temperature sensor 64.

Subsequently to the judgment of "the judgment result: YES" at step S42, at step S44, engine control module 3 performs the soak judgment to judge whether or not the sensor values of fuel temperature sensor 54 and water temperature sensor 55 are the values corresponding to the outside air temperature at this trip (the second trip) which is in the engine cold state. In case of "the judgment result: YES" at step S44, the process proceeds to step S46.

In case of "the judgment result: NO" at step S44, the process proceeds to step S45.

Subsequently to the judgment of "the judgment result: NO" at step S44, at step S45, engine control module 3 prohibits the abnormal state diagnosis of AT oil temperature sensor 64.

Subsequently to the judgment of "the judgment result: YES" at step S44, at step S46, engine control module 3 performs the reconfirm judgment to judge whether or not the sensor values from fuel temperature sensor 54 and water temperature sensor 55 are the variations of the values indicative that there is the temperature variation according to the external factor by the external factor such as the brock heater. In case of "the judgment result: YES" at step S46, the process proceeds to step S48. In case of "the judgment result: NO" at step S46, the process proceeds to step S47.

Subsequently to the judgment of "the judgment result: NO" at step S46, at step S47, engine control module 3 prohibits the abnormal state diagnosis of AT oil temperature sensor 64.

Subsequently to the judgment of "the judgment result: YES" at step S46, at step S48, engine control module 3 sends the judgment permission signal (to vary the signal from 0 to 1 (0->1)) to AT control unit 4. Then, the process is finished.

Accordingly, when the ignition switch 51 is switched from the OFF state to the ON state at the second trip after the engine stop after the first trip and the warm-up judgment is "the judgment result: NO", the process in the flowchart of FIG. 4 proceeds as step S41->step S42->step S43. At step S43, the abnormal state diagnosis of AT oil temperature sensor 61 is prohibited.

Moreover, when the ignition switch 51 is switched from the OFF state to the ON state at the second trip after the engine stop after the first trip, the warm-up judgment is "the judgment result: YES" and the soak judgment is "judgment result: NO", the process proceeds as step S41->step S42->step S44->step S45 in the flowchart of FIG. 4. At step S45, the abnormal state diagnosis of AT oil temperature sensor 64 is prohibited.

Furthermore, when the ignition switch 51 is switched from the OFF state to the ON state at the second trip after the engine stop after the first trip, the warm-up judgment is "the judgment result: YES", the soak judgment is "the judgment result: YES", and the reconfirm judgment is "the judgment result: NO", the process proceeds as step S41->step S42->step S44->step S46->step S47 in the flowchart of FIG. 4. At step S47, the abnormal state diagnosis of AT oil temperature sensor 64 is prohibited.

On the other hand, when the ignition switch 51 is switched from the OFF state to the ON state at the second trip after the engine stop after the first trip, and all of the warm-up judgment, the soak judgment, and the reconfirm judgment are "the judgment result: YES", the process proceeds as step S41->step S42->step S44->step S46->step S48 in the flowchart of FIG. 4. At step S48, the judgment permission signal is sent to the AT control unit 4.

That is, the flowchart shown in FIG. 4 corresponds to the sensor normal operation judgment step that engine control module 3 reads the warm-up judgment result by the warm-up judgment step when engine 1 is restarted after waiting for the engine cold state by the engine stop after the engine warm-up state, and starts to judge whether or not the engine side temperature sensor (fuel temperature sensor 54 and water temperature sensor 55) including the warm-up judgment result normally performs the temperature detection operation.

At the sensor normal operation judgment step shown in the flowchart of FIG. 4, engine control module 3 outputs the permission signal to AT control unit 4 when the warm-up judgment result by the warm-up judgment step is the normal state, the soak judgment results of the engine side temperature sensors 54 and 55 are the normal states, and the reconfirm results of the engine side temperature sensors 54 and 55 are the normal states.

[Provisional Judgment Step and Final Judgment Step]

Figure 5:
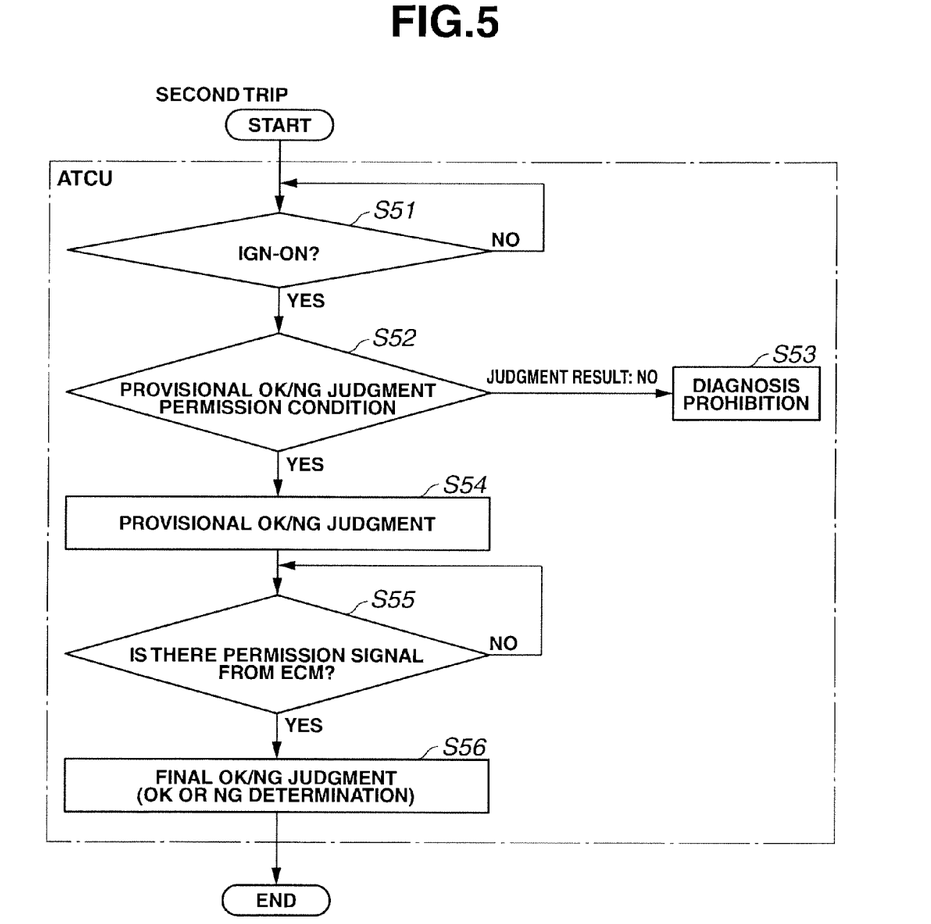
FIG. 5 is a flowchart showing a flow of a provisional judgment step and a final judgment step performed at the second trip in an AT control unit according to the first embodiment of the present invention.

FIG. 5 is a view showing a flow of the provisional judgment step and the final judgment step which are performed at the second trip by AT control unit 4 (ATCU) according to the first embodiment of the present invention. The provisional judgment step and the final judgment step are illustrated with reference to the flowchart of FIG. 5.

At step S51, AT control unit 4 judges whether or not the switch signal from ignition switch 51 is the ON state. When the answer of step S51 is affirmative (YES; IGN-ON), the process proceeds to step S52. When the answer of step S52 is negative (NO; IGN-OFF), the process repeats the judgment of step S51.

Subsequently to the judgment of the IGN-ON at step S51, at step S52, AT control unit 4 judges a provisional OK/NG judgment permission condition for obtaining the water temperature sensor value from water temperature sensor 55 and the oil temperature sensor value from AT oil temperature sensor 64 in the normal state (in the appropriate state). In case of "the judgment result: YES" at step S52, the process proceeds to step S54. In case of "the judgment result: NO" at step S52, the process proceeds to step S53.

In this case, the provisional OK/NG judgment permission condition is the timer (the elapsed time period) elapsed after the switching to the ON state of ignition switch 51, the condition that the voltage is equal to or greater than a prescribed voltage (specified voltage), and so on. This satisfies the time condition that this trip (the second trip) is started after the sufficient time period elapsed until the engine is brought to the engine cold state by the engine stop from the engine warm-up state by the previous trip (the first trip).

Subsequently to "the judgment result: NO" at step S52, at step S53, AT control unit 4 prohibits the abnormal state diagnosis of AT oil temperature sensor 64.

Subsequently to the "the judgment result: YES" at step S52, at step S54, AT control unit 4 compares the water temperature sensor value and the oil temperature sensor value, and performs the provisional judgment to output the OK judgment or the NG judgment. Subsequently to step S54, the process proceeds to step S55.

Figure 6:
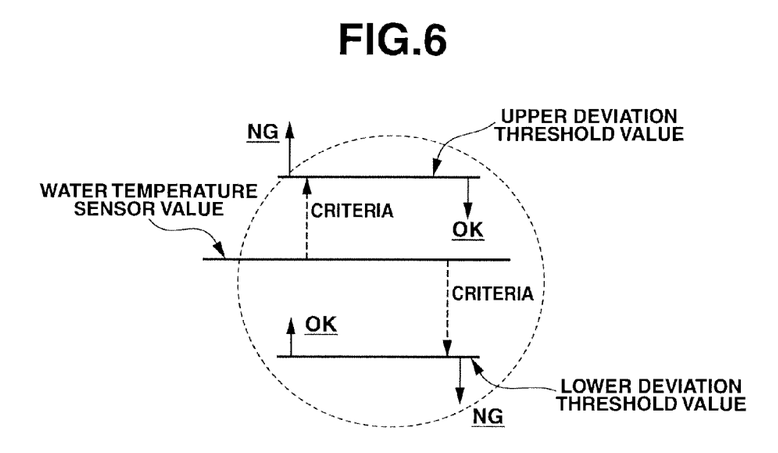
FIG. 6 is an illustrative view showing a judgment method of an OK judgment and an NG judgment at the provisional judgment step in the first embodiment of the present invention.

In this case, in the provisional judgment, in case where the water temperature sensor value is smaller than the oil temperature sensor value (the water temperature sensor value<the oil temperature sensor value) as shown in FIG. 6, the OK judgment is outputted when the upper deviation width of the oil temperature sensor value with respect to the water temperature sensor value is equal to or smaller than the upper deviation threshold value, and the NG judgment is outputted when the upper deviation width of the oil temperature sensor value with respect to the water temperature sensor value is greater than the upper deviation threshold value. On the other hand, in a case where the water temperature value is greater than the oil temperature sensor value (the water temperature sensor value>the oil temperature sensor value), the OK judgment is outputted when the lower deviation width of the oil temperature sensor value with respect to the water temperature sensor value is equal to or smaller than the lower deviation threshold value, and the NG judgment is outputted when the lower deviation width of the oil temperature sensor value with respect to the water temperature sensor value is greater than the lower deviation threshold value.

Subsequently to the provisional OK/NG judgment at step S54, at step S55, AT control unit 4 judges whether or not the judgment permission signal is inputted from engine control module 3. When the answer of step S54 is affirmative (YES) (there is the judgment permission signal), the process proceeds to step S56. When the answer of step S55 is negative (NO) (there is no judgment permission signal), the process repeats the judgment of step S55.

Subsequently to the judgment that there is the judgment permission signal at step S55, at step S56, AT control unit 4 performs the final judgment to determine the judgment result (the OK judgment or the NG judgment) performed by the provisional OK/NG judgment at step S54. Subsequently to the final judgment of step S56, the process is finished.

Accordingly, when the ignition switch 51 is switched from the OFF state to the ON state at the second trip after the engine stop after the first trip, and the provisional OK/NG judgment permission condition judgment is "the judgment result: YES", the process proceeds as step S51->step S52->step S53 in the flowchart of FIG. 5. At step S53, the abnormal state diagnosis of AT oil temperature sensor 64 is prohibited.

On the other hand, when ignition switch 51 is switched from the OFF state to the ON state at the second trip after the engine stop after the first trip, and the provisional OK/NG judgment permission condition judgment is "the judgment result: YES", the process proceeds as step S51->step S52->step S54 in the flowchart of FIG. 5. At step S54, the provisional OK/NG judgment is performed by comparing the water temperature sensor value and the oil temperature sensor value.

That is, step S51 to step S54 of the flowchart shown in FIG. 5 correspond to the provisional judgment process that AT control unit 4 configured to control automatic transmission 2 connected to engine 1 receives the water temperature sensor value from water temperature sensor 55 when engine 1 is restarted after waiting for the engine cold state by the engine stop after the engine warm-up state, and judges whether or not the upper or lower deviation width between the water temperature sensor value and the oil temperature sensor value from AT oil temperature sensor 64 is equal to or smaller than the predetermined threshold value.

At step S54, the provisional OK/NG judgment is performed. Subsequently to step S54, the process proceeds to step S55. At step S55, AT control unit 4 repeats to judge whether or not there is the permission signal from engine control module 3 (ECM).

Subsequently to the input of the judgment permission signal from engine control module 3 at step S55, the process proceeds to step S56. At step S56, AT control unit 4 performs the final judgment to finally determine the judgment result by the provisional OK/NG judgment.

That is, step S55-step S56 in the flowchart shown in FIG. 5 correspond to the final judgment step that AT control unit 4 determines the judgment result by the provisional judgment step when AT control unit 4 receives the permission signal outputted from engine control module 3 based on the judgment that the engine side temperature sensors (fuel temperature sensor 54 and water temperature sensor 55) are normally operated.

[Problems of Abnormal State Detection of AT Oil Temperature Sensor]

Figure 7:
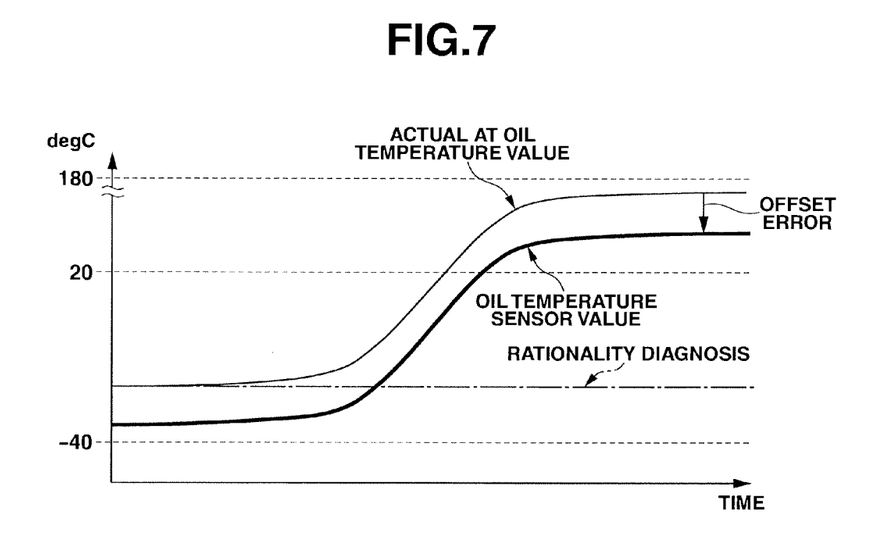
FIG. 7 is an illustrative view showing an offset abnormal mode which is sensed by the abnormal state diagnosis method for the oil temperature sensor of the automatic transmission in the first embodiment of the present invention.

FIG. 7 is a view showing an offset abnormal mode which is sensed by the abnormal state diagnosis method for the oil temperature sensor of the automatic transmission according to the first embodiment of the present invention. Hereinafter, problems of the abnormal state detection of the AT oil temperature sensor are illustrated with reference to FIG. 7.

In general, in a rationality diagnosis of the AT oil temperature sensor, when the oil temperature value discerned by the AT control unit is remained within the constant (certain) range during the constant (certain) time period against the actual AT oil temperature value, it is judged that the AT oil temperature sensor is in the abnormal state.

However, the abnormal mode of the AT oil temperature sensor includes an offset abnormal mode which has an offset error with respect to the actual AT oil temperature sensor value, and which always has a deviation by the offset error although the oil temperature sensor value is varied to follow the variation of the actual AT oil temperature sensor value, as shown in FIG. 7.

On the other hand, in the above-described rationality diagnosis of the AT oil temperature sensor, the oil temperature sensor value is not remained within the constant range during the constant time period, as shown in FIG. 7. Accordingly, in case of the offset abnormal mode, it is not possible to judge that the AT oil temperature sensor is in the abnormal state.

When the AT control unit controls the automatic transmission by the information of the oil temperature by the oil temperature sensor value, the following problems are generated due to the deviation of the oil temperature sensor value with respect to the actual AT oil temperature value.

For example, when the lock-up control of the automatic transmission is performed, the start of the lock-up is delayed, so that the fuel economy is deteriorated. Moreover, when the shift control of the automatic transmission is performed, the shift (gear) stages on the low gear sides is selected more than necessary, so that the fuel economy is deteriorated. Moreover, when the line pressure control of the automatic transmission is performed, the line pressure is controlled to the excessive pressure, so that the fuel economy is deteriorated. In this way, in the various control operations of the automatic transmission by using the information of the oil temperature, the fuel economy is deteriorated by the abnormal state of the AT oil temperature sensor. With this, the deterioration of the exhaust gas such as the increase of the exhaust gas amount is generated.

On the other hand, there is the OBD law (OBD: On-Board Diagnostics) to oblige to monitor the control condition of the exhaust gas of the vehicle by the vehicle-mounted computer. When the abnormal state is generated in the components relating to the exhaust gas, it is necessary that an abnormal state display light is lighted to inform the driver of the abnormal state. However, the general rationality diagnosis of the AT oil temperature sensor cannot sense the offset abnormal mode which causes the deterioration of the exhaust gas. Accordingly, there is a problem that the OBD law is not satisfied.

[Function of Offset Abnormal Mode Detection by Mutual Diagnosis]

As described above, it is necessary to meet the detection request of the offset abnormal mode by sensing the abnormal state of the AT oil temperature sensor in the offset abnormal mode which causes the deterioration of the exhaust gas, for satisfying the OBD law. Hereinafter, the offset abnormal mode detection operation by the mutual diagnosis to respond to the above-described matter is illustrated with reference to FIG. 8.

Figure 8:
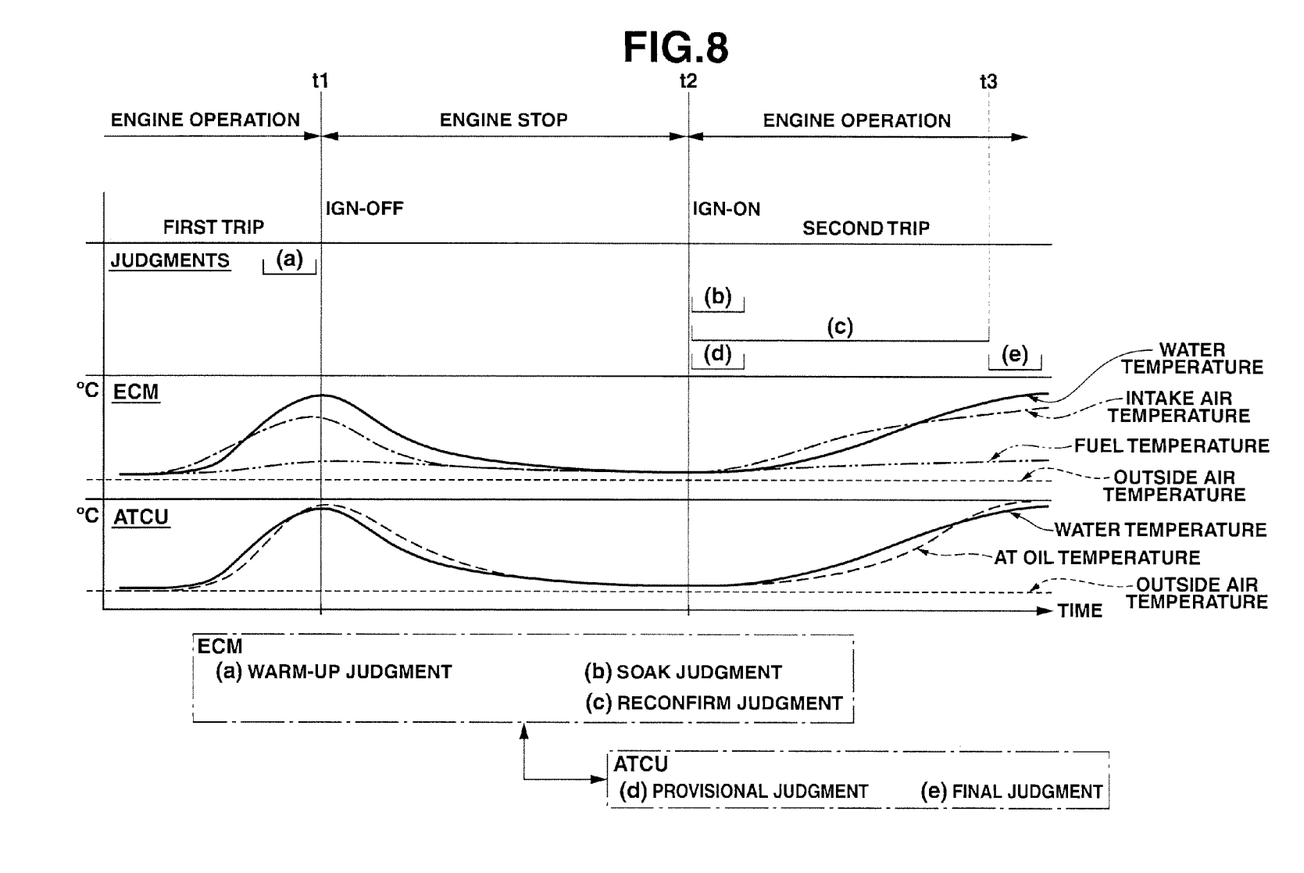
FIG. 8 is a time chart showing characteristics of engine operation/stop, ignition ON/OFF, judgment timings, judgment temperature of ECM, and judgment temperature of ATCU.

When it is sensed whether the AT oil temperature sensor is in the normal state or the abnormal state, engine control module 3 performs the engine warm-up judgment (a) when the engine is operated until a time t1 of FIG. 8 at the first trip. In this engine warm-up judgment (a), the normal state is judged by detections that the sensor values from the engine side temperature sensors (fuel temperature sensor 54 and water temperature sensor 55) immediately before the switching to the OFF state of ignition switch 51 show the engine warm-up state (the water temperature>the fuel temperature>the outside air temperature) as shown in an ECM temperature characteristics immediately before time t1 of FIG. 8.

Then, when ignition switch 51 is switched to the OFF state at time t1 of FIG. 8, the water temperature, the intake air temperature, and the fuel temperature are gradually decreased from time t1 to time t2 by the stop of the engine, and approach the outside air temperature. Next, when the second trip is started by the switching of ignition switch 51 from the OFF state to the ON state at time t2 of FIG. 8, engine control module 3 performs the soak judgment (b) and the reconfirm judgment (c). In this soak judgment (b), the normal state is judged when the sensor values from the engine side temperature sensors (fuel temperature sensor 54 and water temperature sensor 55) are the values substantially corresponding to the outside air temperature (for example, the water temperature=the fuel temperature the outside temperature) as shown in the ECM temperature characteristic immediately after time t2 of FIG. 8. In the reconfirm judgment (c), the normal state is judged when the sensor values from the engine side temperature sensors (fuel temperature sensor 54 and water temperature sensor 55) show that there are the temperature variation (for example, the increase of the water temperature) according to the external factor, due to the external factor such as the block heater, as shown in the ECM temperature characteristic from time t2 to time t3 of FIG. 8.

As described above, the diagnosis of engine control module 3 to judge whether or not the engine side temperature sensors (fuel temperature sensor 54 and the water temperature sensor 55) are normally operated is performed by monitoring and comparing the sensor values in the engine warm-up state of the previous trip (the first trip) and the sensor values at the restart of the engine at this trip, when engine 1 is restarted. This is because the large temperature difference is generated if the engine side temperature sensors (fuel temperature sensor 54 and water temperature sensor 55) are normally operated since the temperature environments of the engine warm-up state and the engine cold state are different from each other.

On the other hand, in the diagnosis of AT control unit 4 to judge the abnormal state of AT oil temperature sensor 64, first, when the second trip is started by switching ignition switch 51 from the OFF state to the ON state at time t2 of FIG. 8, AT control unit 4 performs the provisional judgment (d). In this provisional judgment (d), when the provisional OK/NG judgment permission condition is satisfied, AT control unit 4 receives the water sensor value from water temperature sensor 55. AT control unit 4 judges "the OK judgment" when the upper or lower deviation width between the water temperature sensor value and the oil temperature sensor value from AT oil temperature sensor 64 is equal to or smaller than the predetermined threshold value, and judges "the NG judgment" when the upper or lower deviation width between the water temperature sensor value and the oil temperature sensor value is greater than the predetermined threshold value. The reason for performing this provisional judgment (d) prior to the final judgment (e) is that the water temperature sensor value and the oil temperature sensor value are the values substantially corresponding to the outside air temperature immediately after the restart of the engine when water temperature sensor 55 and AT oil temperature sensor 64 are in the normal state as shown in the ATCU temperature characteristic immediately after time t2 of FIG. 8. That is, even if the OK/NG judgment is performed in retard of the switching of OFF->ON of ignition switch 51, the water temperature sensor value and the oil temperature sensor value are already increased from the value substantially corresponding to the outside air temperature, so that it is not possible to perform the accurate OK/NG judgment.

At time t3 at which the reconfirm judgment (c) is finished, when AT control unit 4 receives the permission signal outputted from engine control module 3 based on the judgment that the sensor values of the engine side temperature sensors (fuel temperature sensor 54 and water temperature sensor 55) are normally operated (in the normal state), AT control unit 4 performs the final judgment (e) to directly determine the result of the provisional judgment (d).

In this way, the final judgment (e) of the offset abnormal mode in which the oil temperature sensor value from AT oil temperature sensor 64 is deviated from the normal value is performed by the mutual diagnosis to perform the diagnosis of engine control module 3 and the diagnosis of AT control unit 4. The timing of the final judgment (e) is a timing immediately after the restart of the engine at which the time period (t3-t2) (for example, 0-300 seconds) necessary for the normal operation judgment of the sensor values of the engine side temperature sensors (fuel temperature sensor 54 and water temperature sensor 55) is elapsed from the time t2 of the engine restart at this trip (the second trip).

In particular, for example, when about 300 seconds are needed for the reconfirm judgment (c), the OK judgment or the NG judgment is determined by final judgment (e) after about 300 seconds elapsed from time t2 of the engine restart at the second trip. Moreover, for example, when the only soak judgment (b) is performed without performing the reconfirm judgment (c), the OK judgment or the NG judgment is determined by the final judgment (e) at a timing substantially synchronous with time t2 of the restart of the engine at the second trip.

Consequently, it is possible to obtain, at a timing immediately after the restart of engine 1, the judgment result (the OK judgment or the NG judgment) to judge whether or not AT oil temperature sensor 64 is in the offset abnormal mode in which the oil temperature sensor value of AT oil temperature sensor 64 is deviated from the normal value, without conditioning on the vehicle running. When the offset abnormal mode of AT oil temperature sensor 64 is sensed, exhaust air warning light 8 is lighted based on the NG judgment determined at the timing immediately after the restart of the engine so as to inform the driver of the abnormal mode. With this, it is possible to satisfy the OBD law.

(1) An abnormal state diagnosis method for an oil temperature sensor of an automatic transmission according to the embodiment of the present invention includes: a warm-up judging step (FIG. 3) of judging whether or not a sensor value from an engine side temperature sensor (fuel temperature sensor 54, water temperature sensor 55) in an engine warm-up state indicates the engine warm-up state, in an engine control module (3) configured to control an engine (1); a sensor normal operation judgment step (FIG. 4) of reading the warm-up judgment result by the warm-up judgment step (FIG. 3) in the engine control module (3) when the engine is restarted after waiting for an engine cold state by an engine stop after the engine warm-up state, and of starting to judge whether or not the engine side temperature sensor (fuel temperature sensor 54, water temperature sensor 54) including the warm-up judgment result normally performs a temperature detection operation, in the engine control module (3); a provisional judgment step (S51-S54) of receiving the sensor value from the engine side temperature sensor in an automatic transmission control unit (4) arranged to control an automatic transmission (2) connected with the engine when the engine (1) is restarted after waiting for the engine cold state by the engine stop after the engine warm-up state, and of judging whether or not an upper or lower deviation width between the sensor value of the engine side temperature sensor (fuel temperature sensor 54, water temperature sensor 55) and an oil temperature sensor value from an automatic transmission oil temperature sensor (AT oil temperature sensor 64) is equal to or smaller than a predetermined threshold value, in the automatic transmission control unit (4); and a final judgment step (S55, S56) of determining the judgment result by the provisional judgment step (S51-S54) in the automatic transmission control unit (AT control unit 4) when the automatic transmission control unit (AT control unit 4) receives a permission signal outputted from the engine control module (3) based on a judgment that the engine side temperature sensor (fuel temperature sensor 54, water temperature sensor 55) is normally operated.

Accordingly, it is possible to obtain the judgment result to judge whether or not it is in the offset abnormal mode in which the oil temperature sensor value is deviated from the normal value, without conditioning on the vehicle running at the timing immediately after the restart of engine 1.

(2) In the abnormal state diagnosis method according to the embodiment of the present invention, the sensor normal operation judgment step (FIG. 4) is configured to output the permission signal from the engine control module (3) to the automatic transmission control unit (AT control unit 4) when the warm-up judgment result by the warm-up judgment step (FIG. 3) is a normal state, a soak judgment result of the engine side temperature sensor (fuel temperature sensor 54, water temperature sensor 55) is the normal state, and a reconfirm judgment result of the engine side temperature sensor is the normal state.

Accordingly, it is possible to accurately perform the judgment to judge whether or not the engine side temperature sensors (fuel temperature sensor 54 and water temperature sensor 55) are normally operated, by including the reconfirm judgment by the reconfirmation.

(3) In the abnormal state diagnosis method according to the embodiment of the present invention, the engine temperature sensor includes a water temperature sensor (55) arranged to sense a temperature of an engine coolant water; and the provisional judgment step (S51-S54) is configured to receive a water temperature sensor value from the water temperature sensor (55), to judge an OK judgment when the upper or lower deviation width of the oil temperature sensor value from the automatic transmission oil temperature sensor (AT oil temperature sensor 64) with respect to the water temperature sensor value is equal to or smaller than a predetermined threshold value, and to judge an NG judgment when the upper or lower deviation width of the oil temperature sensor value with respect to the water temperature sensor value is greater than the predetermined threshold value.

Accordingly, it is possible to accurately sense the offset abnormal mode of the oil temperature sensor of the automatic transmission (AT oil temperature sensor 64) by comparing the oil temperature sensor value and the water temperature sensor value which vary in synchronism with the engine warm-up state by the high following capability.

(4) In the abnormal state diagnosis method according to the embodiment of the present invention, the automatic transmission oil temperature sensor (AT oil temperature sensor 64) is a component which relates to an exhaust gas, and which uses the oil temperature value for the control of the automatic transmission (2) as an oil temperature information when the automatic transmission control unit (AT control unit 4) controls the automatic transmission (2); and the abnormal state diagnosis method further includes an exhaust gas warning step (FIG. 2) of lighting an exhaust air warning light (8) disposed inside the vehicle when the NG judgment is determined by the final judgment step (S55, S56).

Accordingly, when the offset abnormal mode of the oil temperature sensor of the automatic transmission (AT oil temperature sensor 64) is sensed, exhaust warning light 8 is lighted based on the NG judgment determined at the timing immediately after the restart of the engine so as to inform the driver of the abnormal mode. With this, it is possible to satisfy the OBD law.

As described above, the abnormal state diagnosis method of the automatic transmission oil temperature sensor is illustrated with reference to the first embodiment. Although the invention has been described above by reference to the first embodiment of the invention, the invention is not limited to the first embodiment described above. Modifications and variations of the first embodiment described above are included as long as they are not deviated from the gist of the invention.

In the first embodiment, in the sensor normal operation judgment step, when the warm-up judgment result, the soak judgment result, and the reconfirm judgment are the normal state, engine control module 3 outputs the permission signal to control unit 4. However, in the sensor normal operation judgment step, the engine control module may output the permission signal to the AT control unit when the warm-up judgment result and the soak judgment result are the normal state.

In the first embodiment, in the provisional judgment step, AT control unit 4 receives the water temperature sensor value from water temperature sensor 55. AT control unit 4 judges the OK judgment when the upper or lower deviation width of the oil temperature sensor value of AT oil temperature sensor 64 with respect to the water temperature sensor value is equal to or smaller than the predetermined threshold value, and judges the NG judgment when the upper or lower deviation width of the oil temperature sensor value of AT oil temperature sensor 64 with respect to the water temperature sensor value is greater than the predetermined threshold value. However, in the provisional judgment step, the intake air temperature value from intake air temperature sensor 53 and the fuel temperature value from fuel temperature sensor 54 may be used as the sensor values from the engine side temperature sensors. Moreover, it is optional to employ an outside air temperature estimate value estimated based on the sensor values of intake air temperature sensor 53, fuel temperature sensor 54, and water temperature sensor 55 provided as the engine side temperature sensors, as a reference value for comparing with the oil temperature sensor value.

In the first embodiment, the abnormal state diagnosis method of the automatic transmission oil temperature sensor is applied to the vehicle provided with the driving system in which engine 1 and automatic transmission 2 having the stepwise gear stages are connected with each other. However, the abnormal state diagnosis method of the automatic transmission temperature sensor may be applied to a vehicle provided with a driving system in which the engine and a continuously variable transmission having continuous gear ratios. The vehicle is not limited to the engine vehicle as long as the vehicle is provided with the driving system including the engine and the automatic transmission. The abnormal state diagnosis method may be applied to the hybrid vehicle.

The entire contents of Japanese Patent Application No. 2011-243015 filed Nov. 7, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An abnormal state diagnosis method for an oil temperature sensor of an automatic transmission, the abnormal state diagnosis method comprising:
performing, in an engine control module configured to control an engine, a warm-up judgment comprising judging whether or not a sensor value from an engine side temperature sensor during an engine warm-up state indicates the engine warm-up state;
performing, in the engine control module, a sensor normal operation judgment comprising:
reading a result of the warm-up judgment in the engine control module when the engine is restarted after waiting for an engine cold state from a stopping of the engine after the engine warm-up state, and
starting to judge whether or not the engine side temperature sensor, accounting for the result of the warm-up judgment, performs an engine side temperature detection operation in a normal state;
performing, in an automatic transmission control unit configured to control the automatic transmission, a provisional judgment comprising:
receiving the sensor value from the engine side temperature sensor in the automatic transmission control unit configured to control the automatic transmission, which is connected with the engine when the engine is restarted after waiting for the engine cold state from the stopping of the engine after the engine warm-up state, and
judging whether or not an upper deviation width or a lower deviation width between the sensor value of the engine side temperature sensor and an oil temperature sensor value from the oil temperature sensor of the automatic transmission is equal to or smaller than a predetermined threshold value; and
performing, a final judgment comprising determining a result of the provisional judgment in the automatic transmission control unit when the automatic transmission control unit receives a permission signal outputted from the engine control module based on a judgment that the engine side temperature sensor is operated in the normal state.

2. The abnormal state diagnosis method as claimed in claim 1, wherein the sensor normal operation judgment comprises outputting the permission signal from the engine control module to the automatic transmission control unit when the result of the warm-up judgment is in the normal state, a result of a soak judgment of the engine side temperature sensor is in the normal state, and a result of a reconfirm judgment of the engine side temperature sensor is in the normal state.

3. The abnormal state diagnosis method as claimed in claim 1,
wherein the engine temperature sensor includes a water temperature sensor configured to sense a temperature of an engine coolant water; and
wherein the provisional judgment comprises:
receiving a water temperature sensor value from the water temperature sensor,
providing an OK judgment when an upper deviation width or a lower deviation width of the oil temperature sensor value from the oil temperature sensor of the automatic transmission with respect to the water temperature sensor value is equal to or smaller than a predetermined threshold value, and
providing an NG judgment when the upper deviation width or the lower deviation width of the oil temperature sensor value with respect to the water temperature sensor value is greater than the predetermined threshold value.

4. The abnormal state diagnosis method as claimed in claim 3,
wherein the oil temperature sensor of the automatic transmission is a component which relates to an exhaust gas, and is configured to control the automatic transmission based on an oil temperature value, the oil temperature value corresponding to oil temperature information when the automatic transmission control unit controls the automatic transmission; and
wherein the abnormal state diagnosis method further comprises providing an exhaust gas warning by lighting an exhaust air warning light disposed inside a vehicle when the NG judgment is determined by the final judgment.

* * * * *